Patented July 31, 1951

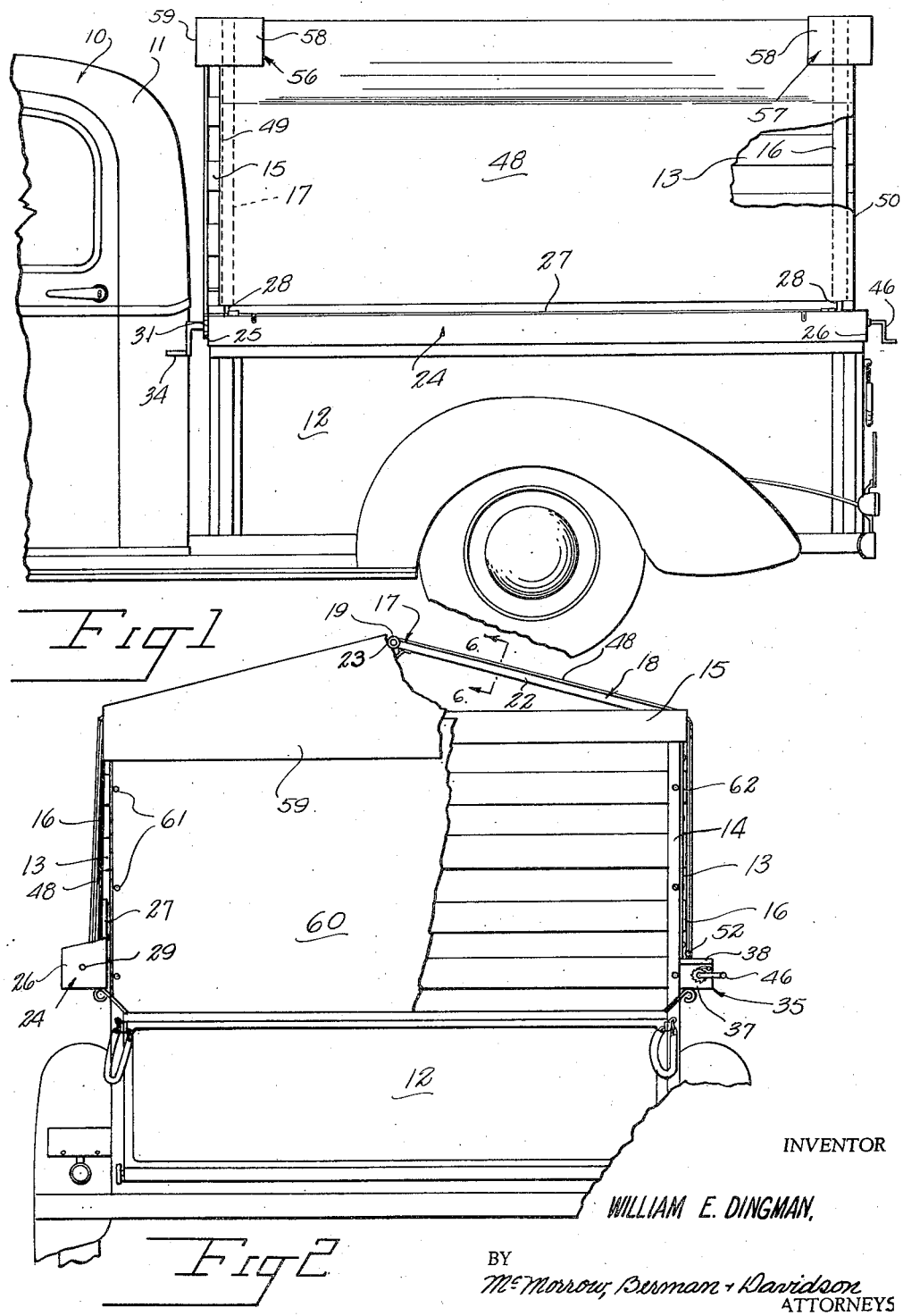

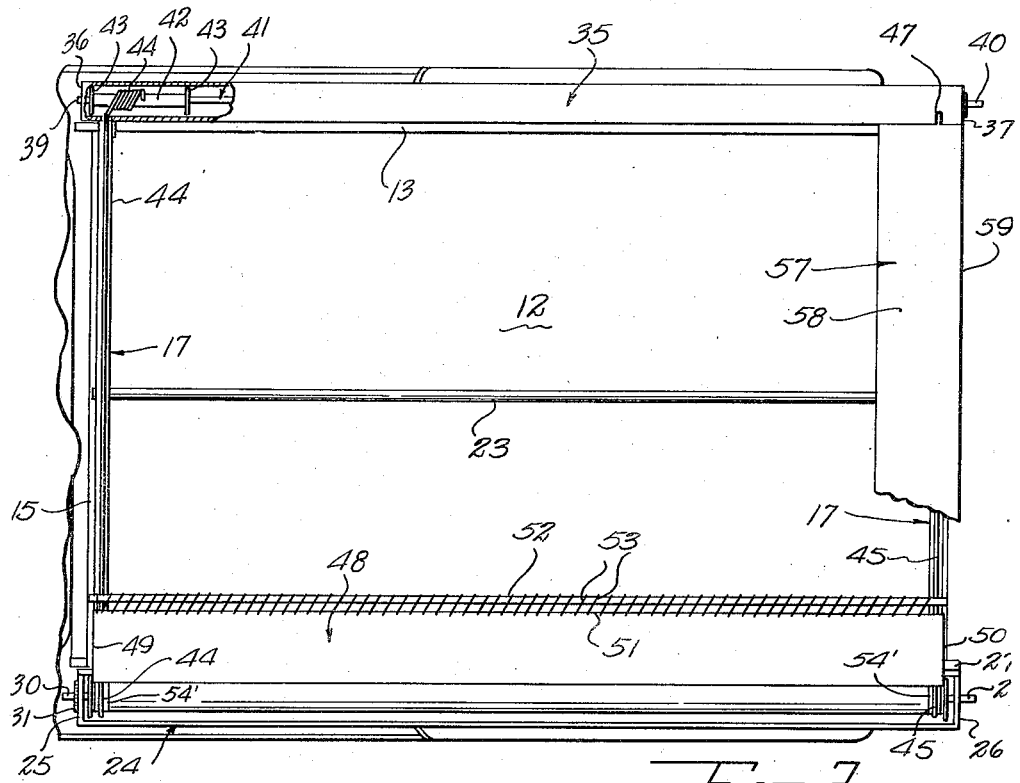

2,562,300

UNITED STATES PATENT OFFICE 2,562,300

FLEXIBLE COVER FOR PICKUP TRUCKS

William E. Dingman, Peace Valley, Mo.

Application November 4, 1949, Serial No. 125,515

3 Claims. (Cl. 296—98)

My invention relates to a flexible cover for trucks and the like.

An important object of my invention is to provide a flexible cover or tarpaulin for trucks of the type which have low open bodies rearwardly of the cab, and usually referred to as "pick-ups."

A further object is to provide a cover or tarpaulin for trucks which may be rapidly raised by the truck driver for covering the truck during rains, and the like.

A further object is to provide a device of the above mentioned character which forms a permanent attachment or rig for a truck and which includes a storage box or housing for the flexible cover.

A still further object of the invention is to provide a flexible cover for pick-up trucks which is highly simplified, easy to operate, and relatively inexpensive to manufacture.

Other objects and advantages of the invention will be apparent during the course of the following description.

In the accompanying drawings, forming a part of this application, and in which like numerals are employed to designate like parts throughout the same, Figure 1 is a side elevation of a pick-up truck equipped with a flexible cover embodying my invention, Figure 2 is a rear end elevation of the same, parts broken away, Figure 3 is a fragmentary plan view of the cover and associated elements, parts omitted and parts broken away, Figure 4 is an enlarged fragmentary perspective view illustrating the manner in which a cable is secured to a flexible cover, Figure 5 is an enlarged fragmentary plan view of a corner of the flexible cover, Figure 6 is an enlarged fragmentary transverse vertical section taken on line 6—6 of Figure 2, Figure 7 is a fragmentary plan view showing one end of a cover storage box, part broken away, and, Figure 8 is an enlarged end elevation of the storage box, parts in section and parts broken away.

In the drawings, where for the purpose of illustration is shown a preferred embodiment of my invention, the numeral 10 designates a pick-up truck having a cab 11 and a low flat open type body 12 disposed rearwardly of the cab 11. The body 12 is equipped with a pair of removable vertical side frames 13, which are slatted, as shown, and preferably formed of wood. These side frames 13 include forward and rear vertical end posts 14 which project below the bottoms of the side frames for engagement in sockets carried by the body 12, not shown. At the forward end of the body 12, a vertical forward end frame 15 is provided, and extends between the forward ends of the side frames 13. The frame 15 also has vertical end posts, detachably secured in sockets of the body 12. The construction and mounting of the side and end frames 13 and 15 are conventional and well known. The frames 13 and 15 project substantially to the top of the cab 11, and form with the body 12 a high rectangular storage compartment for the truck.

Rigidly secured to the outer sides of the side frames 13 adjacent to their forward and rear ends are narrow flat elongated vertical straps or bars 16, which extend for substantially the entire height of the frames 13 above the top of the body 12. These straps 16 may be bolted, or otherwise rigidly secured to the boards or slats of the frames 13. Rigidly secured to the tops of the straps 16, and preferably formed integral therewith, are forward and rear trusses 17, which are vertically disposed adjacent to the forward and rear ends of the frames 13 and body 12. The trusses 17 include opposed connected straight inclined sections or sides 18 which converge upwardly to form a peak or gable 19, at the transverse center of the body 12, and the sides 18 of the trusses are formed to provide laterally opposed spaced longitudinal flat flanges 20 and 21 and a central longitudinal U-shaped channel 22, secured to the inner edges of the flanges 20 and 21 and projecting below the same, and extending for the entire lengths of the sides or sections 18.

I provide a horizontal longitudinal ridge pole or beam 23, rigidly secured to the peaks 19 of the trusses 17 and extending longitudinally between the trusses and at the longitudinal center line of the truck. The top of the ridge pole is preferably flush with the tops of the peaks or gables 19, and the pole serves to form a rigid structure with the trusses 17. The ridge pole 23 is preferably removably mounted upon the trusses 17, in any suitable manner, so that it may be removed if in the way during loading of the truck.

Rigidly mounted upon the left hand side frame 13, Figure 2, and disposed at the bottom of such side frame and extending longitudinally for substantially the entire length of the side frame, is a horizontal elongated sheet metal casing or box 24, including forward and rear ends 25 and 26 and a hinged cover 27 which is adapted to swing upwardly about the inner longitudinal side of the box 24 so that it will lie vertically against the adjacent frame 13, Figure 2. The hinged cover 27 is provided near and slightly inwardly of the box ends 25 and 26 with elongated transverse slots 28, which extend through the outer longitudinal edge of the hinged cover, and substantially for the entire width of the cover, Figures 7 and 8. Arranged centrally within the box 24 and extending for the entire length of the box and having its opposite ends journaled within openings in the ends 25 and 26 of the box is an elongated straight rotatable shaft 29, including a square extension 30, which projects longitudinally forwardly of the forward end 25 of the box 24. Mounted upon the squared extension 30, for rotation therewith, and disposed adjacent to the forward end 25 is a ratchet wheel 31, having teeth 32 which engage a pivoted pawl 33, pivotally mounted upon the forward end 25 of the box and arranged above the shaft 29, Figure 8. A detachable crank handle 34 is provided for the square extension 30, to facilitate turning the shaft 29.

Rigidly mounted upon the right hand frame 13, Figure 2, and disposed laterally opposite the box 24 and extending longitudinally for the entire length of the frames 13, is an elongated rectangular horizontal housing or box 35, including forward and rear ends 36 and 37, and a removable cover 38. The box 35 may be somewhat smaller in transverse cross-section than the box 24. The forward and rear ends 36 and 37 have aligned central openings, within which are journaled forward and rear extensions 39 and 40 of an elongated horizontal straight rotatable shaft 41, which extends centrally and longitudinally within the box 35 and for the entire length thereof. Near its opposite ends, and inwardly of the ends 36 and 37, the shaft 41 has cable spools 42, including end discs 43 to facilitate winding cables 44 and 45 upon the spools 42 when the shaft 41 is turned. The extension 40 may be squared, for receiving a crank handle 46, detachably connected therewith for turning the shaft 41. Near and slightly inwardly of the ends 36 and 37, the top or cover 38 is provided with openings 47 to permit the passage of the cables 44 and 45 into and out of the box 35.

The cables 44 and 45 have their free ends secured to the spools 42, Figure 3, and are adapted to extend through the top 38 and vertically upwardly along the outer faces of the straps 16, and then longitudinally inwardly along the trusses 17, as shown. The cables 44 and 45 engage slidably within the channels 22 of the trusses 17, and are guided longitudinally by these channels.

A flexible rectangular cover or tarpaulin of canvas 48 or like material has one longitudinal edge attached to the shaft 29 within the box 24. The cover 48 extends for substantially the entire length of the box 24 and is adapted to be completely housed within the box 24 when entirely wound upon the shaft 29. The forward and rear transverse edges 49 and 50 of the cover 48 lie adjacent to and parallel with the outer edges of the trusses 17, Figure 3, so that when the cover 48 is drawn from the box 24 it will slide over the tops of the flanges 20 and 21 of the trusses. The free longitudinal edge 51 of the cover 48 carries a substantially rigid longitudinal rod 52, which may be lashed to the edge 51 with cord or wire 53. The purpose of the rod 52 is to prevent the cover 48 from sagging between the trusses 17. Slightly inwardly of the transverse edges 49 and 50 of the cover, elongated transverse tapes or strips 54' are stitched or otherwise secured to the bottom of the cover 48, and these tapes extend for the entire width of the cover and parallel to its edges 49 and 50. The tapes are folded to form longitudinal depending pleats 54, arranged adjacent and parallel to the channels 22, and adapted to enter the channels for traveling longitudinally therein. The cables 44 and 45 are lashed to the bottoms of the pleats 54 by means of cord or wire 55, and the cables extend for the entire width of the cover 48 and parallel to the edges 49 and 50 thereof. Each cable is thus secured to the under side of the cover 48 and connected with a pleat 54 to ride in a channel 22, Figure 6, at its portion secured to the cover 48 and at its free portion beyond the longitudinal edge 51 of the cover 48, Figure 3. The cables 44 and 45 are adapted to pass through the slots 28 when the cover 48 is entirely wound upon the shaft 29, and stored within the box 24.

Forward and rear sheet metal cowlings 56 and 57 are removably mounted upon the trusses 17, and have their tops 58 spaced slightly above the flanges 20 and 21 so that the cover 48 and cables may slide freely beneath the cowlings and over the flanges 20 and 21. The cowlings 56 and 57 include outer vertical panels or ends 59, disposed slightly outwardly of the ends of the frames 13.

Detachable flat canvas end covers or flaps 60 may be arranged at the forward and rear ends of the frames 13, and inwardly of the vertical ends 59 of the cowlings. These flaps 60 may be provided at their opposite sides with snap fasteners 61, for co-action with companion snap fasteners 62 carried by the ends of the frames 13. The cowlings 56 and 57 and end flaps 60 may be omitted, if desired.

The operation of the device is as follows:

The crank handle 34 may be turned for winding the cover 48 and the portions of the cables 44 and 45 secured to the cover upon the shaft 29. The entire cover 48 including the rod 52 is thus stored within the box 24, and the cover 27 of the box may be closed, the slots 28 receiving the cables 44 and 45. The cables at this time extend over the trusses 17 and lie within the channels 22 thereof. The free ends of the cables remain attached to the spools 42 at all times.

When it is desired to raise the cover 48, during rains, and the like, the crank 48 is turned and the cables will be wound upon the spools 42 within the box 35. The cables pass through the openings 47 and into the box 35. When the rod 52 is pulled upwardly in the box 24 by the cables, it will automatically swing the cover 27 inwardly vertically to the open position, Figure 2, and the slots 28 being open at their forward ends will permit the cover 27 to pass the cables 44 and 45. The cover 48 is unwound from the shaft 29 and travels upwardly along the adjacent frame 13 and over the trusses 17, as previously described. The cover 48 will continue to travel until all of the free portions of the cables 44 and 45 are wound upon the spools 42, and until the rod 52 reaches the top 38 of the box 35. The extension 40 is provided with a pawl and ratchet similar to the pawl 33 and ratchet 31, for holding the cover in the raised position.

The cover may thus be conveniently and rapidly raised and lowered and its construction is such that it will not flap appreciably in the wind or otherwise become disarranged. The cover is very easy to operate, and the construction is highly simplified and compact. The cable storage box 35 may also be used as a convenient storage place for small tools. Since the entire rig is mounted upon the frames 13, when such frames are removed from the body 12, the rig may be moved bodily with them. The device in no way detracts from the general neat appearance of the truck.

It is to be understood that the form of the invention herewith shown and described is to be taken as a preferred example of the same, and that various changes in shape, size and arrangement of parts may be resorted to, without departing from the spirit of the invention or the scope of the subjoined claims.

Having thus described my invention, I claim:

1. A cover rig for pick-up trucks of the type having a low open body, comprising a pair of upstanding side frames mounted upon opposite sides of the body and projecting above the body, forward and rear gabled trusses secured to the side frames near their forward and rear ends and extending transversely between and connecting the side frames, a longitudinal ridge pole connecting the tops of the trusses and extending longitudinally of the truck body at the transverse center thereof, a first elongated horizontal box including a hinged cover secured to one side frame near its bottom and extending for substantially the entire length of the side frame, a longitudinal shaft coextensively journaled within the first box, manually operated means to turn the shaft and lock it in selected adjusted positions, a second box mounted upon the opposite side frame at substantially the elevation of the first box and extending for substantially the same length as the first box, a second longitudinal shaft mounted within the second box, cable spools carried by the second shaft for rotation therewith and arranged near the opposite ends of the second box, the second box including a cover provided with openings adjacent to the cable spools, manually operated means for rotating the second shaft and ratchet means for locking said shaft in selected positions, a flexible cover having one longitudinal edge secured to the first shaft and adapted to be wound completely upon the first shaft for storage in the first box, cables secured to the flexible cover and extending transversely thereof for the entire width of the cover and including portions extending beyond the free longitudinal edge of the cover and transversely of the truck body for engagement over the trusses, guide means for said cables formed in the trusses, the free ends of the cables being connected with the spools of the second shaft to be wound thereon, and a rod secured to the free longitudinal edge of the cover to prevent it from sagging between the trusses, the cover sliding over the trusses when the cables are wound upon the spools.

2. A cover rig for pick-up trucks of the type having a low open body, comprising a pair of upstanding removable side frames mounted upon the opposite sides of the body, and projecting above the body, forward and rear transverse gabled trusses secured to the side frames near their forward and rear ends and connecting the side frames to form a rigid structure, the trusses including outer vertical straps extending downwardly along the outer faces of the side frames and rigidly secured to the side frames, the trusses including upper inclined sections having longitudinal channels formed therein, a flexible cover for the body of the truck, a housing for said cover on one of the side frames, said cover comprising a rectangular sheet formed with transverse depending pleats adjacent to its forward and rear transverse edges, the pleats being arranged to project into the channels of the trusses, cables lashed to the bottoms of the pleats and adapted to ride in the channels of the trusses, the cables extending transversely beyond one end of the sheet and for the entire width of the sheet, winding means mounted upon the other side frame and connected with the free ends of the cables for winding them up to pull the sheet from the housing and over the trusses.

3. A cover rig for pick-up trucks of the type having a low open body, comprising a pair of opposed upstanding side frames mounted upon the opposite sides of the body, forward and rear trusses mounted upon the side frames and extending transversely between and connecting the side frames, a first box mounted upon one side frame near the bottom thereof, a first shaft mounted for rotation within the box, manually operated means for rotating the shaft and locking it in selected adjusted positions, the first box having a vertically swingable hinged cover provided near its opposite ends with transverse slots connecting with the free longitudinal edge thereof, a second box mounted upon the opposite side frame and including a top having openings disposed laterally opposite the slots, a second shaft rotatably mounted within the second box, manually operated means to turn the second shaft and lock it at selected adjusted positions, a flexible cover sheet having one longitudinal end secured to the first shaft so that the cover sheet may be wound thereon for storage in the first box, cables extending transversely across the cover sheet and beyond the free longitudinal edge thereof and secured to the under side of the cover sheet and having their free ends secured to the second shaft, the cables extending longitudinally over and being guided by the trusses so that when they are wound upon the second shaft the cover sheet will be pulled out of the first box and over the trusses, the cables being adapted to pass through the slots of the hinged cover and through the openings of the cover of the second box, the free longitudinal edge of the cover sheet engaging the hinged cover to swing it open when the cover sheet is pulled out of the first box, the cables passing through the slots of the hinged cover when it swings open, a stiffening rod carried by the free longitudinal edge of the cover sheet to prevent it from sagging between the trusses, and a longitudinal ridge pole connecting the tops of the trusses for supporting the cover sheet between the trusses.

WILLIAM E. DINGMAN.

REFERENCES CITED

The following references are of record in the file of this patent:

UNITED STATES PATENTS

| Number | Name | Date |
| --- | --- | --- |
| 473,292 | Campbell | Apr. 19, 1892 |
| 900,350 | Brooks | Oct. 6, 1908 |
| 928,495 | Busenbark | July 20, 1909 |
| 1,318,820 | Watkins | Oct. 14, 1919 |
| 1,656,077 | Schlicher | Jan. 10, 1928 |